US007658989B2

(12) United States Patent
DeSimone et al.

(10) Patent No.: US 7,658,989 B2
(45) Date of Patent: Feb. 9, 2010

(54) NANO-AND MICRO-CELLULAR FOAMED THIN-WALLED MATERIAL, AND PROCESSES AND APPARATUSES FOR MAKING THE SAME

(75) Inventors: Joseph M. DeSimone, Chapel Hill, NC (US); Srinivas Siripurapu, Raleigh, NC (US); Saad A. Khan, Cary, NC (US); Richard J. Spontak, Raleigh, NC (US); Joseph Royer, Greenville, SC (US)

(73) Assignees: North Carolina State University, Raleigh, NC (US); The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 10/109,174

(22) Filed: Mar. 27, 2002

(65) Prior Publication Data
US 2002/0168509 A1 Nov. 14, 2002

Related U.S. Application Data

(60) Provisional application No. 60/344,633, filed on Nov. 2, 2001, provisional application No. 60/279,343, filed on Mar. 28, 2001.

(51) Int. Cl.
*B32B 3/26* (2006.01)
*B32B 9/00* (2006.01)
(52) U.S. Cl. .............. 428/304.4; 428/315.5; 428/316.6; 428/318.4
(58) Field of Classification Search ............. 428/304.4, 428/318.4, 316.6, 315.5
See application file for complete search history.

(56) References Cited

U.S. PATENT DOCUMENTS 4,473,665 A    9/1984  Martini-Vvedensky et al. ................... 521/79

(Continued)

FOREIGN PATENT DOCUMENTS

EP       0 481 517 A1    4/1992

(Continued)

OTHER PUBLICATIONS

Royer et al., "CO$_2$-Assisted Polymer Processing: Accessing New Processing Windows and Novel Morphologies," *Polymeric Materials*, 84: xxx (2001).

(Continued)

*Primary Examiner*—Victor S Chang
(74) *Attorney, Agent, or Firm*—Myers Bigel Sibley & Sajovec, PA

(57) ABSTRACT

Polymeric materials having a plurality of cells formed therein are described. The polymeric materials include a foamed layer comprising a plurality of uniform microcells, nanocells or combinations thereof in a closed cell network, a transition layer positioned adjacent to the foamed layer, and at least one unfoamed outer layer positioned adjacent to the transition layer. The foamed layer may be present in a volume ranging from about 80 to about 99 percent based on the volume of the polymeric material, the transition layer may present in a volume ranging from about 0 to about 10 percent based on the volume of the polymeric material, and the at least one outer layer may be present in a volume ranging from about 0.01 to about 10 percent based on the volume of the polymeric material. Methods of making such polymeric materials are also described, as are apparatus for providing foamed polymeric materials.

23 Claims, 7 Drawing Sheets

U.S. PATENT DOCUMENTS

| | | | |
|---|---|---|---|
| 4,642,734 A * | 2/1987 | Anderson | 361/820 |
| 5,158,986 A | 10/1992 | Cha et al. | 521/82 |
| 5,160,674 A | 11/1992 | Colton et al. | 264/50 |
| 5,451,633 A | 9/1995 | DeSimone et al. | 524/731 |
| 5,589,105 A | 12/1996 | DeSimone et al. | 252/351 |
| 5,639,836 A | 6/1997 | DeSimone et al. | 526/201 |
| 5,674,957 A | 10/1997 | DeSimone et al. | 526/89 |
| 5,676,705 A | 10/1997 | Jureller et al. | 8/142 |
| 5,683,977 A | 11/1997 | Jureller et al. | 510/286 |
| 5,756,021 A | 5/1998 | Hedrick et al. | 264/45.1 |
| 5,776,990 A | 7/1998 | Hedrick et al. | 521/77 |
| 5,783,082 A | 7/1998 | DeSimone et al. | 210/634 |
| 5,824,157 A | 10/1998 | Foster et al. | 118/419 |
| 5,864,172 A | 1/1999 | Kapoor et al. | 257/634 |
| 5,997,781 A * | 12/1999 | Nishikawa et al. | 264/45.1 |
| 6,001,418 A | 12/1999 | DeSimone et al. | 427/240 |
| 6,077,792 A | 6/2000 | Farrar | 438/780 |
| 6,083,565 A | 7/2000 | Carbonell et al. | 427/430.1 |
| 6,107,357 A | 8/2000 | Hawker et al. | 521/77 |
| 6,111,199 A | 8/2000 | Wyland et al. | 174/52.2 |
| 6,140,221 A | 10/2000 | Annapragada et al. | 438/622 |
| 6,319,858 B1 | 11/2001 | Lee et al. | 438/787 |
| 6,593,384 B2 * | 7/2003 | Anderson et al. | 521/97 |
| 6,773,640 B2 * | 8/2004 | Sugihara et al. | 264/50 |

FOREIGN PATENT DOCUMENTS

| | | |
|---|---|---|
| EP | 1085041 A1 | 3/2001 |
| FR | 1.524.620 | 5/1968 |
| JP | 55000713 | 1/1980 |
| JP | 08224461 | 8/1996 |

OTHER PUBLICATIONS

International Search Report corresponding to PCT/US02/09420; Date of Mailing: Sep. 5, 2002.

* cited by examiner

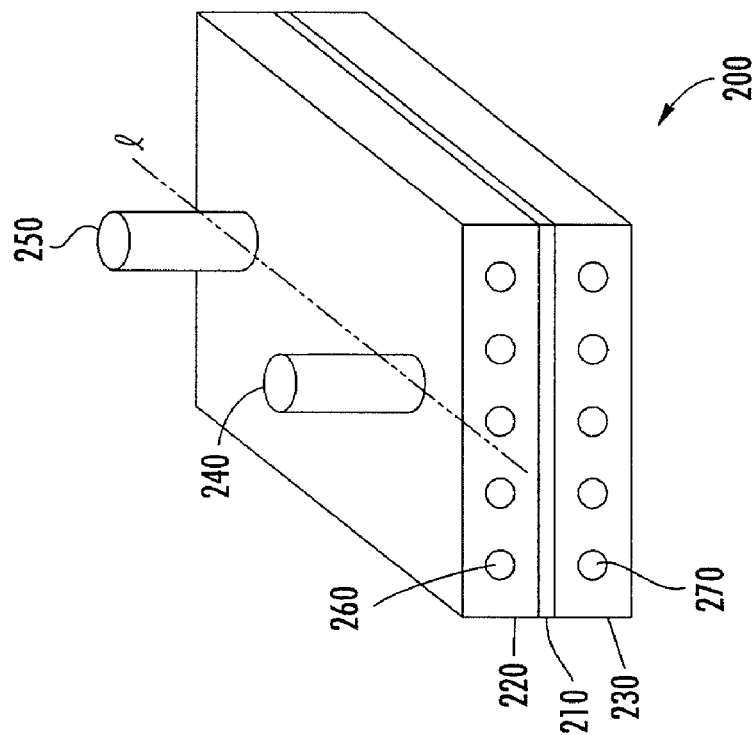
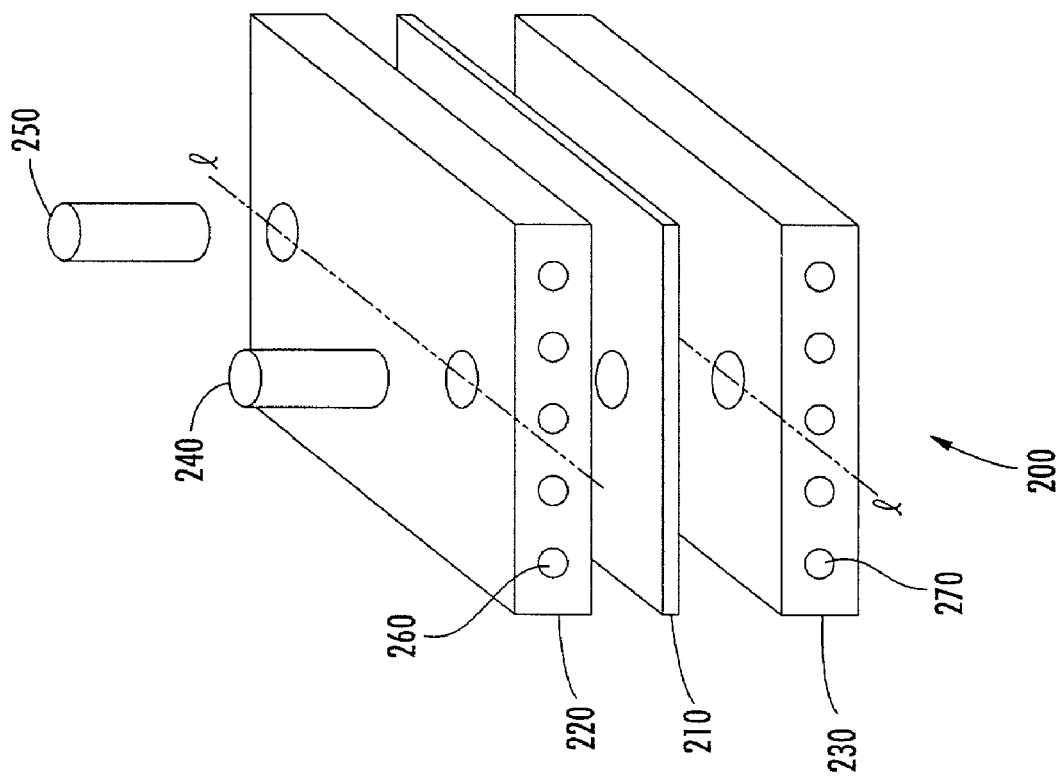

NANO- AND MICRO-CELLULAR FOAMED THIN-WALLED MATERIAL, AND PROCESSES AND APPARATUSES FOR MAKING THE SAME

RELATED APPLICATIONS

This application claims the benefit of U.S. Provisional Application No. 60/279,343, filed Mar. 28, 2001, and United States Provisional Application No. 60/344,633, the disclosures of each of which are incorporated herein by reference in their entirety.

FIELD OF THE INVENTION

The present invention relates to foamed polymeric materials.

BACKGROUND OF THE INVENTION

There have been various research efforts to develop potentially reliable and commercially viable microcellular/nanocellular foams and foaming processes. A sizeable portion of these efforts has primarily focused on foaming polymer disks or films in batch foaming processes. Using these processes, various observations have been made. In general, for many systems that produce microcellular foam, the foam morphology contains three main regions. First, at the skin, a solid polymer matrix is formed, the morphology of which is believed to be attributable to the rapid diffusion of carbon dioxide in the polymer. A conventional skin typically ranges in size from about 50 to 100 µm. The inside core of the material is typically found to contain the most uniform cell structure with cell sizes typically ranging from about 1 to 10 µm. A mix of cells with a relatively large size distribution and unfoamed polymer is typically present in a transition between the inner core of polymeric material and outer skin.

There is a need in the art to produce polymeric foamed materials that have reduced outer layer unfoamed region sizes, particularly with respect to the foamed inner core. Additionally, there is a need in the art to produce foams with decreased cell size.

SUMMARY OF THE EMBODIMENTS OF THE INVENTION

According to embodiments of the present invention, a polymeric material having a plurality of cells formed therein includes a foamed layer comprising a plurality of uniform microcells, nanocells or combinations thereof in a closed cell network, a transition layer positioned adjacent said foamed layer, and at least one unfoamed outer layer positioned adjacent to said transition layer. The foamed layer is present in a volume ranging from about 80 to about 99 percent based on the volume of the polymeric material, the transition layer is present in a volume ranging from about 0 to about 10 percent based on the volume of the polymeric material, and the at least one outer layer is present in a volume ranging from about 0.01 to about 10 percent based on the volume of the polymeric material.

According to other embodiments of the present invention, a method of making a polymeric material having a plurality of microcells, nanocells, or combinations thereof arranged in a closed-cell network is provided. The method includes contacting a material to be foamed with a fluid mixture comprising carbon dioxide to foam the material, wherein the material is present in a reactor having a predetermined volume, and wherein the ratio of the volume of the prefoamed polymeric material to the predetermined volume is selected such that a plurality of microcells, nanocells, or combinations thereof arranged in a closed-cell network are formed in the material.

According to still other embodiments of the present invention, an apparatus for foaming a polymeric film is provided. The apparatus includes support means that has a polymeric film positioned thereon. The polymeric film has a bottom surface in contact with the support means and a top surface. The apparatus further includes a first movable means positioned opposite the top surface of the polymeric film. The position of the first movable means may be altered to form a first chamber between the polymeric film and the first movable means. The apparatus further includes a first housing that encloses the support means and the first movable means and a second housing attached to the first housing and having a second chamber formed therein. An opening is present in the first housing such that the first chamber is in communication with the second chamber. The apparatus further includes a second movable means positioned in the second housing, where the position of the second movable means may be altered to adjust the size of the second chamber. The apparatus further includes at least one port formed in the second housing to allow fluid transfer into and out of the second housing. The apparatus still further includes at least one channel formed in the support means, where the channel allows a fluid to pass therethrough to cool the polymeric film during the foaming of the film.

According to yet other embodiments of the present invention, a method for foaming a polymeric film includes providing an unfoamed polymeric film having a top surface held against a first movable means contained in a first housing and having a bottom surface held against a support means. The first moveable means is moved away from the top surface of the unfoamed polymeric film such that a chamber is formed therebetween and such that a continuous chamber is formed in the first housing and a second housing. The unfoamed polymeric film is exposed to carbon dioxide introduced in a port exposed in the second housing, where the continuous chamber has a first volume and wherein the carbon dioxide fills the continuous chamber to achieve a first pressure. The first moveable means is positioned towards the first movable means the unfoamed polymeric film and the second moveable means in the second housing is positioned away from the polymeric film to maintain the first volume and the first pressure in the continuous chamber. Fluid is circulated through at least one channel present in the support means to decrease the temperature of the polymeric film, and the carbon dioxide is vented through the port in the second housing such that the polymeric film foams and forms a closed-cell network therein.

According to still other embodiments of the present invention, a method for foaming a polymeric film includes providing an unfoamed polymeric film in a chamber, where the ratio of the volume of the unfoamed polymeric film to the volume of the chamber is between about 0.85 and about 1.0, exposing the polymeric film to a composition comprising carbon dioxide, and reducing the pressure of the composition such that the polymeric film foams and forms a closed-cell network therein.

According to yet other embodiments of the present invention, a method for foaming a polymeric film includes exposing an unfoamed polymeric film having a first surface and a second surface opposite the first surface to a composition comprising carbon dioxide, decreasing the temperature of the unfoamed polymeric film such that the first surface, the second surface or both the first surface and the second surface solidify, and reducing the pressure of the composition such that the polymeric film foams and forms a closed-cell network therein.

According to still other embodiments of the present invention, a method of making a foamed polymeric film having a closed-cell network therein comprising microcells, nanocells, or combinations thereof includes contacting a first surface of an unfoamed polymeric film with a first diffusion barrier, infusing carbon dioxide into the unfoamed polymeric film, contacting a second surface of the unfoamed polymeric film opposite the first surface with a second diffusion barrier, and diffusing carbon dioxide out of the unfoamed polymeric film to provide the foamed polymeric film having a closed-cell network therein comprising microcells, nanocells, or combinations thereof.

According to other embodiments of the present invention, a system for use in foaming a polymeric film is provided. The system includes at least two parallel plates and a polymeric film positioned between the two parallel plates. The system further includes a securing means extends through the at least two parallel plates and the polymeric film. The securing means is preferably tightened to minimize any volume between said at least two parallel plates and said polymeric film. The system further include one or more channels extending through the at least two parallel plates. The one or more channels allow for fluid to pass through the parallel plates and reduce the temperature of the polymeric film.

BRIEF DESCRIPTION OF THE DRAWINGS

FIGS. 3a and 3b are perspective views of a system for containing a polymeric film during foaming according to embodiments of the present invention;

DETAILED DESCRIPTION OF EMBODIMENTS OF THE INVENTION

Figure 1:
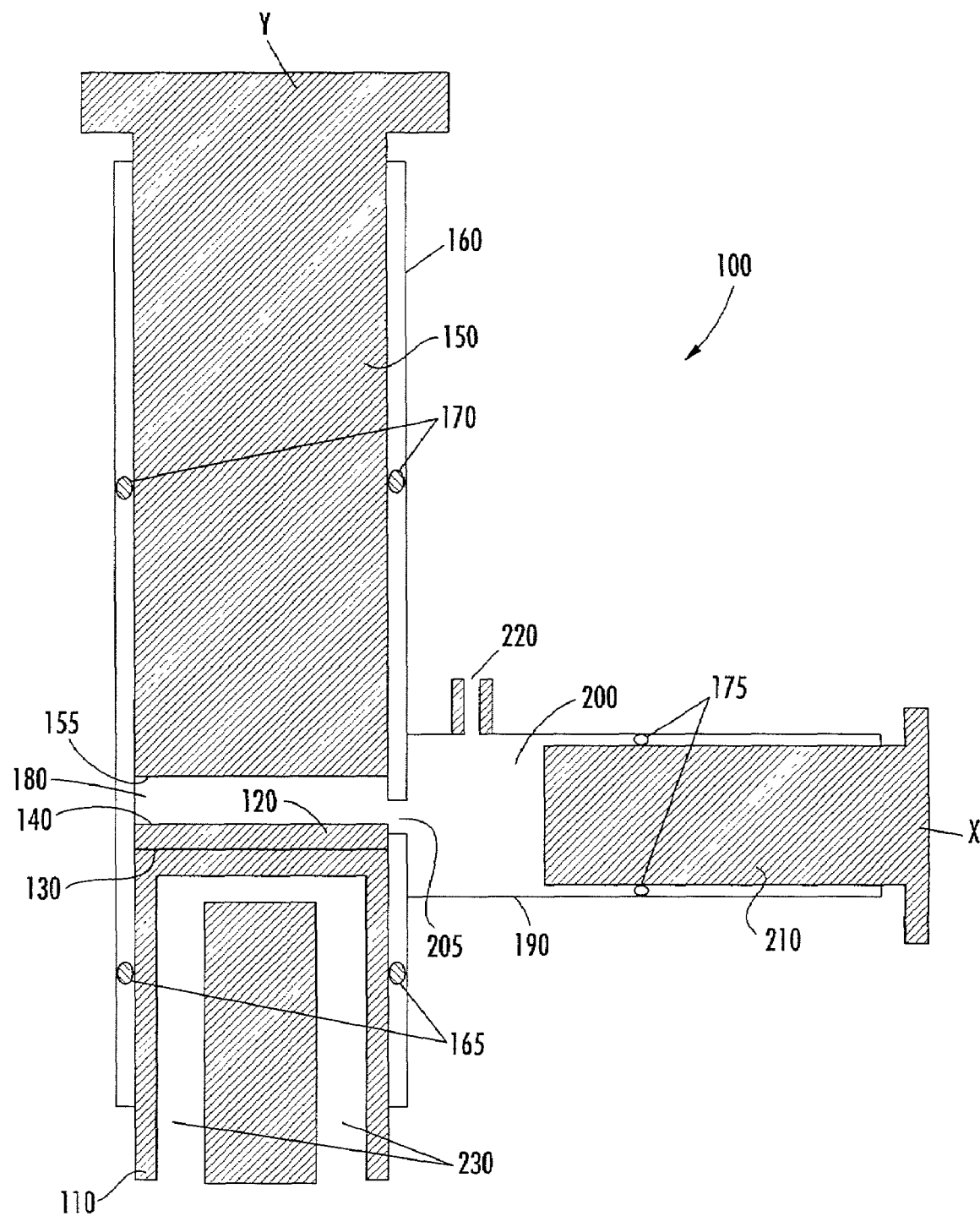
FIG. 1 is a schematic diagram of an apparatus for foaming a polymeric film according to embodiments of the present invention.

The invention will now be described with respect to preferred embodiments described herein. It should be appreciated however that these embodiments are for the purpose of illustrating the invention, and are not to be construed as limiting the scope of the invention as defined by the claims.

Certain ranges of values are described herein as having various possible lower limits and various possible upper limits. While some of the values described for the lower limits may be higher than some of the values described for the upper limits, it is to be understood that when selecting a given range of values, the lower limit selected will be lower than the upper limit selected.

According to embodiments of the present invention, a polymeric material having a plurality of cells formed therein includes a foamed layer comprising a plurality of uniform microcells, nanocells or combinations thereof in a closed cell network, a transition layer positioned adjacent said foamed layer, and at least one unfoamed outer layer positioned adjacent to said transition layer.

According to some embodiments of the present invention, the foamed layer is present in a volume ranging from about a lower limit of 80, 81, 82, 83, 84, 85, 86, 87, 88, 89, 90, 91, 92, 93, 94, 95, 96, 97, or 98 to about an upper limit of about 81, 82, 83, 84, 85, 86, 87, 88, 89, 90, 91, 92, 93, 94, 95, 96, 97, 98, or 99 percent based on the volume of the polymeric material. The volume of the foamed layer preferably ranges from about 80 to about 99 percent of the total polymeric material volume. In a more preferred embodiment, the volume of the foamed layer preferably ranges from about 95 to about 99 percent of the total polymeric material volume. In a still more preferred embodiment, the volume of the foamed layer preferably ranges from about 98 to about 99 percent of the total polymeric material volume. The foamed layer preferably has a thickness ranging from a lower limit of about 0.05, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 91, 92, 93, 94, 95, 96, 97, 98, or 99 μm to about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 91, 92, 93, 94, 95, 96, 97, 98, 99, or 100 μm.

The transition layer typically contains regions that are both unfoamed and foamed. According to some embodiments of the present invention, the transition layer is present in a volume ranging from about a lower limit of 0, 1, 2, 3, 4, 5, 6, 7, 8, or 9 to about an upper limit of 1, 2, 3, 4, 5, 6, 7, 8, 9, or 10 percent based on the volume of the polymeric material. The volume of the transition layer is preferably from about 0 or above 0 to about 10 percent of the polymeric material total volume. In another embodiment, the volume of the transition layer is preferably from about 0 or above 0 to about 5 percent by volume of the polymeric material total volume. In another embodiment, the volume of the transition layer is most preferably from about 0 or above 0 to about 2 percent by volume of the polymeric material total volume. According to some embodiments, the transition layer preferably has a thickness ranging from about a lower limit of 0.0005, 0.005, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, or 9.9 μm to about an upper limit of about 0.005, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or 10 µm. The transition layer preferably has a thickness ranging from about 0.50 nm or 0.05 µm to about 2 µm or 10 µm.

According to embodiments of the present invention, the at least one outer layer is present in a volume ranging from about a lower limit of 0.01, 0.1, 0.5, 1, 2, 3, 4, 5, 6, 7, 8, or 9 to about an upper limit of 0.1, 0.5, 1, 2, 3, 4, 5, 6, 7, 8, 9, or 10 percent based on the volume of the polymeric material. In another embodiment, the volume of the at least one outer layer is preferably from about 0.01 to about 5 percent by volume of the polymeric material total volume. In another embodiment, the volume of the at least one outer layer is preferably from about 0.01 to about 1 percent by volume of the polymeric material total volume. In a particularly preferred embodiment, the at least one unfoamed outer layer (e.g., solid skin layer) is decreased in comparison to those foams generated in accordance with prior art and would most preferably comprise less than 1 percent by volume of the polymeric material. The at least one outer layer preferably has a thickness ranging from about a lower limit of 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, or 9.9 µm to about an upper limit of about 0.005, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or 10 µm. The thickness of the at least one outer layer more preferably ranges from about 50 nm, 0.5 µm or 0.05 µm to about 1 µm, 2 µm, 5 µm or 10 µm.

The polymeric material may be in the form of various shapes and sizes, and may be a film or disk, as examples. The film preferably has a thickness ranging from a lower limit of about 0.1, 0.2, 0.3, 0.4, 0.5, 0.6, 0.7, 0.8, 0.9, 1, 10, 20, 30, 40, 50, 60, 70, 80, 90, 100, 200, 300, or 400 µm to about an upper limit of about 0.2, 0.3, 0.4, 0.5, 0.6, 0.7, 0.8, 0.9, 1, 10, 20, 30, 40, 50, 60, 70, 80, 90, 100, 200, 300, 400, or 500 µm. In preferred embodiments, the film has a thickness ranging from about 100, 500, or 1000 nm to about 50, 100 or 500 µm.

In one embodiment, the polymeric material comprises a foamed layer, two transition layers positioned on opposite sides of and adjacent to the foamed layer, and two outer layers position adjacent to the respective transition layers. The characteristics of the foamed layer, the transition layers, and the outer layers are defined herein.

For the purposes of the invention, the term "nanocells" preferably refers to the cells having a size (i.e., average diameter) ranging from about 10 or 150 nm to about 300, 400, or 500 nm. The term "microcells" preferably refers to the cells having a size (i.e., average diameter) ranging from about 0.5 µm to about 5 µm or 10 µm. Preferably, the closed-cell structure is uniform. For the purposes of the invention, the term "uniform" refers to the cell structure in terms of cell diameters and cell wall thicknesses, which translate to cell densities.

The term "polymer" is to be broadly construed to include, but not be limited to, a homopolymer, copolymer, terpolymer, and the like. Crystalline, semicrystalline, and amorphous polymeric materials can all be foamed in accordance with the method of the invention. Polymers that may be foamed include, for example, thermoplastic and thermoset polymers. A polymer that is foamed is preferably a thermoplastic polymer. Exemplary thermoplastic polymers include, but are not limited to, polyvinyl chloride, polyolefins (e.g., high and low density polyethylene, high and low density polypropylene, and the like), nylons, and fluoropolymers. Examples of fluoropolymers include, without limitation, polyvinylidene fluoride, polyvinyl fluoride, polytetrafluoroethylene, polychlorotrifluoroethylene, polyhexafluoro-isobutylene, fluoropolymers such as those described in U.S. Pat. No. 5,674,957 to DeSimone et al., the disclosure of which is incorporated herein by reference in its entirety, and others. Other polymers that can be employed include, but are not limited to, polyurethane, polystyrene, polycarbonate, polyesters, polyethylene terephthalate, polymethyl methacrylate, nylons, polyimides, polyetherimides, polysulfones, polycarprolactone, and cellulosic and acrylic resins. The SILK™ family of resins made commercially available from The Dow Chemical Company located in Midland, Mich. including SILK™ I Resin, SILK™ H Resin, and CYCLOTENE™ Resins, may also be used. Blends and mixtures of the above may also be used.

The polymeric material may comprise a thermoset polymer. Exemplary thermoset polymers include, but are not limited to, epoxy resins, resole, novolacs, polyurethanes, and polyurea, which is often useful for coating materials such as powder coatings. A silicon-based TEOS polymer is especially preferred.

The polymeric materials of the invention typically possess desirable physical properties. As an example, in one preferred embodiment, the thin film polymeric material has a dielectric constant ranging from about a lower limit of 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, or 4.9 to about an upper limit of 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5.

In another aspect, the invention relates to an article of manufacture. The article of manufacture comprises the polymeric material as defined herein. Various articles of manufacture are encompassed by the present invention. In one embodiment, for example, the article of manufacture is an electronic device, e.g., a microelectronic device. The polymeric material may form various portions of the electronic device, such as an interlayer insulating material in a microelectronic device, for example. Preferably, the polymeric material is coated on a silicon-containing substrate (e.g., wafer) that is ultimately fabricated into the electronic device. In other embodiments, the article of manufacture may be a food packaging, an insulation support, or a structural support. Other articles of manufacture are contemplated in accordance with the invention.

In another aspect, the invention provides a method of making a polymeric material having a plurality of microcells, nanocells, or combinations thereof, arranged in a closed-cell network. The method comprises contacting a material to be foamed with a fluid mixture comprising carbon dioxide to foam the material, wherein the material is present in a reactor having a predetermined volume, and wherein the ratio of the volume of the prefoamed polymeric material to the predetermined volume is selected such that a plurality of microcells, nanocells, or combinations thereof arranged in a closed-cell network are controllably formed in the material.

The method of the invention may be carried out in various forms. In one embodiment, the method takes place as a batch process. In another embodiment, the method is carried out as a semi-continuous or continuous process.

In accordance with the invention, the ratio of the volume of the prefoamed polymeric material to the volume of the reactor (e.g., mold or die) may vary such that the closed-cell, microcellular network is formed therein. In a preferred embodiment, the ratio of the volume of the prefoamed polymeric material to the volume of the reactor ranges from about a lower limit of 0.85, 0.86, 0.87, 0.88, 0.89, 0.9, 0.91, 0.92, 0.93, 0.94, 0.95, 0.96, 0.97, 0.98, or 0.99 to about an upper limit of 0.86, 0.87, 0.88, 0.89, 0.9, 0.91, 0.92, 0.93, 0.94, 0.95, 0.96, 0.97, 0.98, 0.99, or 1.0.

For the purposes of the invention, carbon dioxide is employed in the fluid mixture in a liquid, supercritical, and/or gaseous phase. If a gaseous $CO_2$ is used, it is preferably at a pressure of about 1000 psi or 68 bar. If liquid $CO_2$ is used, the temperature employed during the process is preferably below 31° C. In one embodiment, the $CO_2$ is utilized in a "supercritical" phase. As used herein, "supercritical" means that a fluid medium is above its critical temperature and pressure, i.e., about 31° C. and about 71 bar for $CO_2$. The thermodynamic properties of $CO_2$ are reported in Hyatt, *J. Org. Chem.* 49: 5097-5101 (1984), the disclosure of which is incorporate herein by reference in its entirety, wherein it is stated that the critical temperature of $CO_2$ is about 31° C. Thus, the method of the present invention may be carried out at a temperature above 31° C. For the purposes of the invention, it is preferred to employ $CO_2$ at a pressure ranging from at a lower end of about 500 psi to an upper end of about 5500 psi.

In one embodiment, the fluid mixture may optionally further comprise a surfactant. The surfactants that are employed by the methods of the invention are known to those skilled in the art. Preferably, the surfactants are non-ionic surfactants. Examples of suitable surfactants are set forth in U.S. Pat. Nos. 5,783,082; 5,589,105; 5,639,836; and 5,451,633 all to DeSimone et al.; and U.S. Pat. Nos. 5,676,705; and 5,683,977 each to Jureller et al., the disclosures of each of which are incorporated herein by reference in their entirety. In general, the surfactant may encompass any macromolecule that serves to emulsify, and may be polymeric or non-polymeric.

Preferably, the surfactant has a segment that has an affinity for the material it comes in contact with, or, stated differently, a "$CO_2$-phobic segment". In embodiments wherein thermoplastic polymers are foamed, the "$CO_2$-phobic" segment has an affinity for the polymer material. Exemplary $CO_2$-phobic segments may comprise common lipophilic, oleophilic, and aromatic polymers, as well as oligomers formed from monomers such as ethylene, α-olefins, styrenics, acrylates, methacrylates, ethylene oxides, isobutylene, vinyl alcohols, acrylic acid, methacrylic acid, and vinyl pyrrolidone. The $CO_2$-phobic segment may also comprise molecular units containing various functional groups such as amides; esters; sulfones; sulfonamides; imides; thiols; alcohols; dienes; diols; acids such as carboxylic, sulfonic, and phosphoric; salts of various acids; ethers; ketones; cyanos; amines; quaternary ammonium salts; and thiozoles. Mixtures of any of these components can make up the "$CO_2$-phobic segment". If desired, the surfactant may comprise a plurality of "$CO_2$-phobic" segments. In such an embodiment, each segment could have an affinity for different polymeric resins used in a blend of thermoplastic material.

If desired, the surfactant may comprise a segment that has an affinity for carbon dioxide, or a "$CO_2$-philic" segment. Exemplary $CO_2$-philic segments may include a halogen (e.g., fluoro or chloro)-containing segment, a siloxane-containing segment, a branched polyalkylene oxide segment, or mixtures thereof. Examples of "$CO_2$-philic" segments are set forth in U.S. Pat. Nos. 5,676,705; and 5,683,977 to Jureller et al. If employed, the fluorine-containing segment is typically a "fluoropolymer". As used herein, a "fluoropolymer" has its conventional meaning in the art and should also be understood to include low molecular weight oligomers, i.e., those which have a degree of polymerization greater than or equal to two. See generally Banks et al., *Organofluorine Compounds: Principals and Applications* (1994); see also *Fluorine-Containing Polymers*, 7 Encyclopedia of Polymer Science and Engineering 256 (H. Mark et al. Eds. 2d Ed. 1985). Exemplary fluoropolymers are formed from monomers which may include fluoroacrylate monomers such as 2-(N-ethylperfluorooctane-sulfonamido) ethyl acrylate ("EtFOSEA"), 2-(N-ethylperfluorooctane-sulfonamido) ethyl methacrylate ("EtFOSEMA"), 2-(N-methylperfluorooctane-sulfonamido) ethyl acrylate ("MeFOSEA"), 2-(N-methylperfluorooctane-sulfonamido) ethyl methacrylate ("MeFOSEMA"), 1,1-dihydroperfluorooctyl acrylate ("FOA"), 1,1-dihydroperfluorooctyl methacrylate ("FOMA"), 1,1',2,2'-tetrahydroperfluoroalkylacrylate, 1,1', 2,2-tetrahydroperfluoroalkyl-methacrylate and other fluoromethacrylates; fluorostyrene monomers such as α-fluorostyrene and 2,4,6-trifluoromethylstyrene; fluoroalkylene oxide monomers such as hexafluoropropylene oxide and perfluorocyclohexane oxide; fluoroolefins such as tetrafluoroethylene, vinylidine fluoride, and chlorotrifluoroethylene; and fluorinated alkyl vinyl ether monomers such as perfluoro (propyl vinyl ether) and perfluoro(methyl vinyl ether). Copolymers using the above monomers may also be employed. Exemplary siloxane-containing segments include alkyl, fluoroalkyl, and chloroalkyl siloxanes. More specifically, dimethyl siloxanes and polydimethylsiloxane materials are useful. Mixtures of any of the above may be used. In certain embodiments, the "$CO_2$-philic" segment may be covalently linked to the "$CO_2$-phobic" segment.

Surfactants that are suitable for the invention may be in the form of, for example, homo, random, block (e.g., di-block, tri-block, or multi-block), blocky (those from step growth polymerization), and star homopolymers, copolymers, and co-oligomers. Exemplary homopolymers include, but are not limited to, poly(1,1'-dihydroperfluorooctyl acrylate) ("PFOA"), poly(1,1'-dihydroperfluorooctyl methacrylate) ("PFOMA"), poly(2-(N-ethylperfluorooctanesulfonamido) ethyl methacrylate) ("PEtFOSEMA"), and poly(2-(N-ethylperfluorooctane sulfonamido) ethyl acrylate) ("PEtFOSEA"). Exemplary block copolymers include, but are not limited to, polystyrene-b-poly(1,1-dihydroperfluorooctyl acrylate), polymethyl methacrylate-b-poly(1,1-dihydroperfluorooctyl methacrylate), poly(2-(dimethylamino)ethyl methacrylate)-b-poly(1,1-dihydroperfluorooctyl methacrylate), and a diblock copolymer of poly(2-hydroxyethyl methacrylate) and poly(1,1-dihydroperfluorooctyl methacrylate). Statistical copolymers of poly(1,1-dihydroperfluoro octyl acrylate) and polystyrene, along with poly(1,1-dihydroperfluorooctyl methacrylate) and poly(2-hydroxyethyl methacrylate) can also be used. Graft copolymers may be also be used and include, for example, poly(styrene-g-dimethylsiloxane), poly (methyl acrylate-g-1,1'-dihydroperfluorooctyl methacrylate), and poly(1,1'-dihydroperfluorooctyl acrylate-g-styrene). Random copolymers may be employed and examples of such include, but are not limited to, copolymers or terpolymers of tetrafluoroethylene, vinylidene fluoride, hexafluoropropylene, chlorotrifluoroethylene, and ethylene. Other examples can be found in I. Piirma, *Polymeric Surfactants* (Marcel Dekker 1992); and G. Odian, *Principals of Polymerization* (John Wiley and Sons, Inc. 1991). It should be emphasized that non-polymeric molecules may be used such as perfluoro octanoic acid, surfynols, perfluoro(2-propoxy propanoic) acid, fluorinated alcohols and diols, along with various fluorinated acids, ethoxylates, amides, glycosides, alkanolamides, quaternary ammonium salts, amine oxides, and amines. Commercially preferred surfactants include, for example those in the Zonyl® series sold by E.I. Du Pont de Nemours of Wilmington, Del. and those in the Fluorad® series sold by Minnesota Mining and Manufacturing of St. Paul, Minn. Mixtures of any of the above may be used. Various components which are suitable for the process of the invention are encompassed by the class of materials described in E. Kissa, *Fluorinated Surfactants: Synthesis, Properties, and Applications* (Marcel Dekker 1994). For the purposes of the invention, two or more surfactants may be employed in the invention.

Depending on the number of different type of polymers or polymer resins present in the thermoplastic material, the surfactant can comprise multiple blocks or segments which may be equal to the number of polymers or resins present in the blend. As an example, if two polymers or polymer resins are present as a blend, the surfactant may comprise two blocks or segments wherein each has an affinity for each polymer or polymer resin. If three polymers or polymer resins are employed, the surfactant may comprise three blocks or segments, and so on. In these embodiments, the surfactant may also include a "$CO_2$-philic" segment.

Although a number of examples of surfactants listed herein are in the form of block, random, or graft copolymers, it should be appreciated that other copolymers that are not block, random, or graft may be used.

The amount of surfactant that is used in the fluid mixture may be selected from various values. If employed, the fluid mixture preferably comprises from about 0.01 to about 10 percent by weight of the surfactant, and more preferably from about 0.01 to about 1.0 percent by weight of surfactant. It should be appreciated that this amount depends on several factors including the stability of the surfactant and desired end product.

The fluid mixture may also comprise components in addition to those described above. Exemplary components include, but are not limited to, polymer modifier, water, toughening agents, colorants, dyes, biological agents, rheology modifiers, plasticizing agents, flame retardants, antibacterial agents, flame retardants, and viscosity reduction modifiers. Co-solvents and co-surfactants may also be employed.

Exemplary co-solvents that may be used include, but are not limited to, alcohols (e.g., methanol, ethanol, and isopropanol); fluorinated and other halogenated solvents (e.g., chlorotrifluoromethane, trichlorofluoromethane, perfluoropropane, chlorodifluoromethane, and sulfur hexafluoride); amines (e.g., N-methyl pyrrolidone); amides (e.g., dimethyl acetamide); aromatic solvents (e.g., benzene, toluene, and xylenes); esters (e.g., ethyl acetate, dibasic esters, and lactate esters); ethers (e.g., diethyl ether, tetrahydrofuran, and glycol ethers); aliphatic hydrocarbons (e.g., methane, ethane, propane, ammonium butane, n-pentane, and hexanes); oxides (e.g., nitrous oxide); olefins (e.g., ethylene and propylene); natural hydrocarbons (e.g., isoprenes, terpenes, and d-limonene); ketones (e.g., acetone and methyl ethyl ketone); organosilicones; alkyl pyrrolidones (e.g., N-methyl pyrrolidone); paraffins (e.g., isoparaffin); petroleum-based solvents and solvent mixtures; and any other compatible solvent or mixture that is available and suitable. Mixtures of the above co-solvents may be used.

Exemplary co-surfactants that may be used include, but are not limited to, longer chain alcohols (i.e., greater than $C_8$) such as octanol, decanol, dodecanol, cetyl, laurel, and the like; and species containing two or more alcohol groups or other hydrogen bonding functionalities; amides; amines; and other like components. Suitable other types of materials that are useful as co-surfactants are well known by those skilled in the art, and may be employed in the process of the present invention. Mixtures of the above may be used.

A polymeric film may be deposited onto a substrate via one of several methods. Examples of such methods include, without limitation, conventional techniques employed for thin film processing. Specifically, the film can be deposited via a spin coating, spray coating or free meniscus coating processes. This can be done by either conventional processing in water or and organic solvent or could be done via a $CO_2$ based process. Examples of such techniques are provided in U.S. Pat. Nos. 6,001,418 to DeSimone et al. and 6,083,565 to Carbonell et al., the disclosures of which are incorporated herein by reference in their entireties. Examples of suitable substrates include, without limitation, silica, alumina, silicon wafer, glass, metal, and rock salt. Various film sizes may be obtained. Preferred film sizes range, for example, from about a lower limit of 0.1, 0.2, 0.3, 0.4, 0.5, 0.6, 0.7, 0.8, or 0.9 µm to about an upper limit of 0.2, 0.3, 0.4, 0.5, 0.6, 0.7, 0.8, 0.9, or 1 µm. Most preferably, the film sizes range between 100 nm and 500 nm. The film on the substrate is then positioned (e.g., sandwiched) between the substrate and the diffusion barrier as done in processes described herein. The system is then pressurized to an appropriate temperature and pressure, and allowed to soak for an appropriate amount of time. The system is then rapidly depressurized so as to create a foam as discussed herein. The thin film is then separated from the substrate so as to intend to not disturb the microstructure of the sample. The film is then deposited on TEM grid and images are collected.

In another embodiment, a polymeric material (e.g., film) may also be formed by spinning a composition comprising the polymeric material and a crosslinking agent. Typically, after spinning the film down, the film then is preferably exposed to some form of radiative energy such as, for example, UV light or heat such that the polymer forms a network structure. This radiative energy will be applied in a manner such that the polymeric film becomes crosslinked to a desired extent. Once crosslinked, the film is then exposed to the foaming agent (i.e. $CO_2$). A diffusion barrier is applied from above and then the $CO_2$ pressure is released. Although not intending to be bound by theory, it is believed that by employing such a crosslinking agent, the cell size in the foam may potentially be reduced. Exemplary crosslinking agents include, as an example, organic agents. An example of organic crosslinking agents include, without limitation, peroxides.

Other optional components that may be used in conjunction with the polymeric material include, without limitation, dyes, anti-microbials, plasticizing agents, compatibilizing agents, flame retardants, fillers, as well as others.

In one preferred embodiment, fillers can be employed with the intent of increasing nucleation rates in the foaming process. A preferred filler is a "nanofiller". For the purposes of the invention, a "nanofiller" is preferably defined as a filler in the form of a discrete particle having a mean dimension ranging from about 1, 10, 20, 30, or 40 nm to about 60, 70, 80, 90, or 100 nm. Exemplary fillers include, without limitation, colloidal silica, colloidal gold, carbon black and clay (e.g., nanoclay) particles, as well as combinations thereof. Although not intending to be bound by theory, it is believed that the addition of a filler creates a new interface in the fluid mixture and this interface acts as a heterogeneous nucleation site. The addition of a filler, and in a preferred embodiment nanofiller, may result in higher cell densities and smaller cells compared to homogeneously nucleated foam under similar conditions.

The method of the invention may also comprise other steps. For example, in a preferred embodiment, the method comprises the step of separating the material from the carbon dioxide. As an example, the carbon dioxide may be vented to the atmosphere. These steps may be carried out using known and accepted techniques.

The invention will now be described in greater detail with respect to the drawings. It should be appreciated that the drawings represent preferred embodiments, and should not be construed as limiting the scope of the present invention.

In another aspect, the present invention provides an apparatus for foaming a polymeric film. FIG. 1 illustrates the apparatus 100. The apparatus 100 comprises support means 110 which has a polymeric film 120 positioned thereon. The support means 110 is typically present in the form of a steel piston although other configurations are possible. The polymeric film 120 may be formed from any of the polymers set forth herein, as well as others that may not be mentioned. Prior to foaming, the polymeric film (i.e., unfoamed or pre-foamed polymeric film) preferably has a thickness ranging from about a lower limit of 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 91, 92, 93, 94, 95, 96, 97, 98, or 99 µm to about an upper limit of 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 91, 92, 93, 94, 95, 96, 97, 98, 99, or 100 µm. The polymeric film 120 has a bottom surface 130 in contact with the support means 110 and a top surface 140 facing opposite the bottom surface 130. Positioned opposite the top surface 140 of the polymeric film 120 is first movable means 150. In FIG. 1, the first movable means 150 is in the form of a piston, although other embodiments are possible. The first movable means may be formed from various materials such as, for example, screws, plates, disks, and the like. The position of the first movable means 150 may be varied along an axis Y perpendicular to the polymer film to form a first chamber 180 of variable volume between the top surface 140 of the polymeric film 120 and a surface 155 of the first movable means 150. A first housing 160 surrounds the first movable means 150 and, in this embodiment, is present in the form of a continuous cylinder. Piston seals 170 may be optionally present within the first housing 160. The first housing 160 also surrounds the support means 110 and, optionally, may have seals present 165 within the first housing 160 as shown in FIG. 1.

Also depicted in FIG. 1 is a second housing 190 attached to the first housing 160. The second housing 190 is shown in this embodiment to be perpendicular to the first housing 160. It should be appreciated that the second housing 190 may be present at other angles relative to the first housing 160. A second chamber 200 is present in the second housing 190 such that the first chamber 180 between the polymeric film 120 and the first movable means 150 is in communication with the second chamber 200 formed in the second housing 190 via an opening 205 in the first housing 160. The first chamber 180 and the second chamber 200 together are configured to provide a continuous chamber.

Second movable means 210 are positioned in the second housing 190, and the position of the second movable means 210 may be varied along an axis X relative to the first housing 160. The second movable means is preferably in the form of a piston, although other configurations are possible. Various materials may be used in the second movable means such as, for example, screws, plates, disks, and the like. Accordingly, the size of chamber 200 may be altered as so desired.

As shown in FIG. 1, at least one port 220 is present in second housing 190 to allow processing fluid (e.g., carbon dioxide) to enter and exit the chamber 200. While the embodiments illustrated in FIG. 1 show a single port 220, it is to be understood that more than one port may be provided in the second housing. For example, separate inlet and exit ports may be provided. Additionally, at least one channel 230 is present in support means 110 to allow fluid to pass therethrough to cool the polymeric film 120 during the foaming of the film 120. An example of a cooling fluid includes, without limitation, liquid nitrogen.

According to embodiments of the present invention, the apparatus 100 may be used to make polymeric materials similar to those described above as well as various other polymeric materials. For example, starting with the apparatus 100 configured as shown in FIG. 1, the polymeric film 120 is exposed to a composition comprising carbon dioxide by charging the composition into the second chamber 200 through port 220. The composition fills the first chamber 180 and the second chamber 200, which together are configured to provide a continuous chamber having a first volume, to a desired first pressure. The composition comprising carbon dioxide may be similar to the compositions described above or may be an alternative composition comprising carbon dioxide.

The first pressure may be similar to the pressures described above or may be alternative pressures. Preferably, the first pressure ranges from about 500, 1000, 1500, or 2000 psi to about 3500, 4000, 4500, or 5500 psi and the temperature of the composition ranges from about 25° C., 100° C., or 150° C. to about 200° C., 250° C., 300° C., or 350° C. Although not intending to be bound by theory, it should be appreciated that the processing temperature is typically dependent on the thermodynamics of specific polymer to be foamed as well as the thermodynamics of the specific polymer blowing agent mixture. More particularly, the temperature is typically dependent on the glass transition temperatures of these materials. One skilled in the art can therefore adjust the process temperature accordingly.

After the continuous chamber is filled with the composition comprising carbon dioxide to a first pressure, the composition is preferably maintained at the first pressure for a sufficient amount of time to allow the carbon dioxide in the composition to diffuse into the polymeric film. As will be understood by those skilled in the art, the soak time period will vary (e.g., from a few minutes to six or more hours) depending upon the thickness of the polymeric film. For example, a 100 µm thick polymeric film may be soaked for 2 hours. As will be understood by those skilled in the art, when carbon dioxide diffuses into a polymeric film, the polymeric film may transition from a solid substance to a liquid or semi-liquid substance.

After a sufficient soak time, the first piston 150 is positioned (e.g., moved towards the top surface 140 of the polymeric film 120) such that the surface 155 of the first piston 150 contacts the top surface 140 of the polymeric film 120. The surface 155 of the first piston 150 may act as a diffusion barrier for the top surface 140 of the polymeric film 120 and the support means 110 may act as a diffusion barrier for the lower surface 130 of the polymeric film 130. While it is preferable to contact the top surface 140 of the polymeric film 120 with the surface 155 of the first piston 150, it is to be understood that the surface of the piston need not contact the surface of the polymeric film. As the first piston 150 is positioned, the second piston 210 is positioned (e.g., moved away from the first housing 160 and the polymeric film 120) such that the pressure of the composition is not reduced. Preferably, the first piston and the second piston are positioned such that the volume of the continuous chamber remains constant and the pressure of the composition in the continuous chamber remains constant.

After the surface 155 of the first piston 150 contacts the top surface 140 of the polymeric film 120, the polymeric film 120 is cooled by circulating cooling fluid through the at least one channel 230 in the support means 110. Any number of fluids may be used for circulation in cooling the polymeric film. In one embodiment, liquid nitrogen may be used, preferably at a temperature ranging from about −50° C. to about 0° C. The cooling of the polymeric film 120 may solidify the top surface 140 and/or the bottom surface 130 of the polymeric film 120. While the cooling of the polymeric film preferably occurs after the contacting of the polymeric film with the surface of the first piston, it is to be understood that the cooling of the polymeric film 120 may be performed before, after, or substantially contemporaneously with the contacting of the top surface of the polymeric film with the surface of the first piston.

The pressure in the continuous chamber is then reduced, which results in the foaming of the polymeric film to provide a polymeric film having a closed-cell network therein comprising microcells, nanocells, or combinations thereof. The pressure in the continuous chamber may be reduced by various methods such as increasing the volume of the composition in the continuous chamber or decreasing the temperature of the composition in the continuous chamber. The volume of the composition may be increased by positioning the first piston 150 and/or the second piston 210 to increase the volume of the continuous chamber and/or by venting the composition through the port 220 in the second housing 190. The temperature of the composition may be reduced by various methods such as by providing a cooling jacket around the second housing 190, for example. While the pressure reduction and the cooling of the polymeric film preferably occur substantially contemporaneously, it is to be understood that the cooling of the polymeric film 120 may be performed before, after, or substantially contemporaneously with the reduction of the pressure of the composition.

Preferably, the above method is carried out as a semi-batch process.

The ratio of the volume of the prefoamed polymeric film to the volume of the continuous chamber may vary. In a preferred embodiment, this ratio varies from about from about a lower limit of 0.85, 0.86, 0.87, 0.88, 0.89, 0.9, 0.91, 0.92, 0.93, 0.94, 0.95, 0.96, 0.97, 0.98, or 0.99 to about an upper limit of 0.86, 0.87, 0.88, 0.89, 0.9, 0.91, 0.92, 0.93, 0.94, 0.95, 0.96, 0.97, 0.98, 0.99, or 1.0.

The method may also include other optional steps. As an example, the method may further comprise moving the first movable means away from the top surface of the polymeric film; and removing the polymeric film from the support means.

The foaming of the polymeric material may also take place in a batch foaming system having process control capability to generate a closed-cell foam in the polymeric film. The foam may comprise microcells, nanocells, or combinations thereof. One of the central components of the system is a high-pressure view cell which encloses the polymeric film. A homogeneous temperature distribution in the cell may be achieved in an oven with a cascade control of heating and cooling elements. In a typical embodiment, the cell is pressurized with carbon dioxide using an ISCO syringe pump. Desired operating conditions including pressure and temperature are maintained by a Bridgeview process control computer program (sold by National Instruments) through a Fieldpoint data acquisition system. Additionally, the system may optionally be capable of operating such that variable pressure drop rates can be attained. Manipulation of polymeric film nucleation rates through the use of a control valve assembly is also possible, through computer control.

Figure 2:
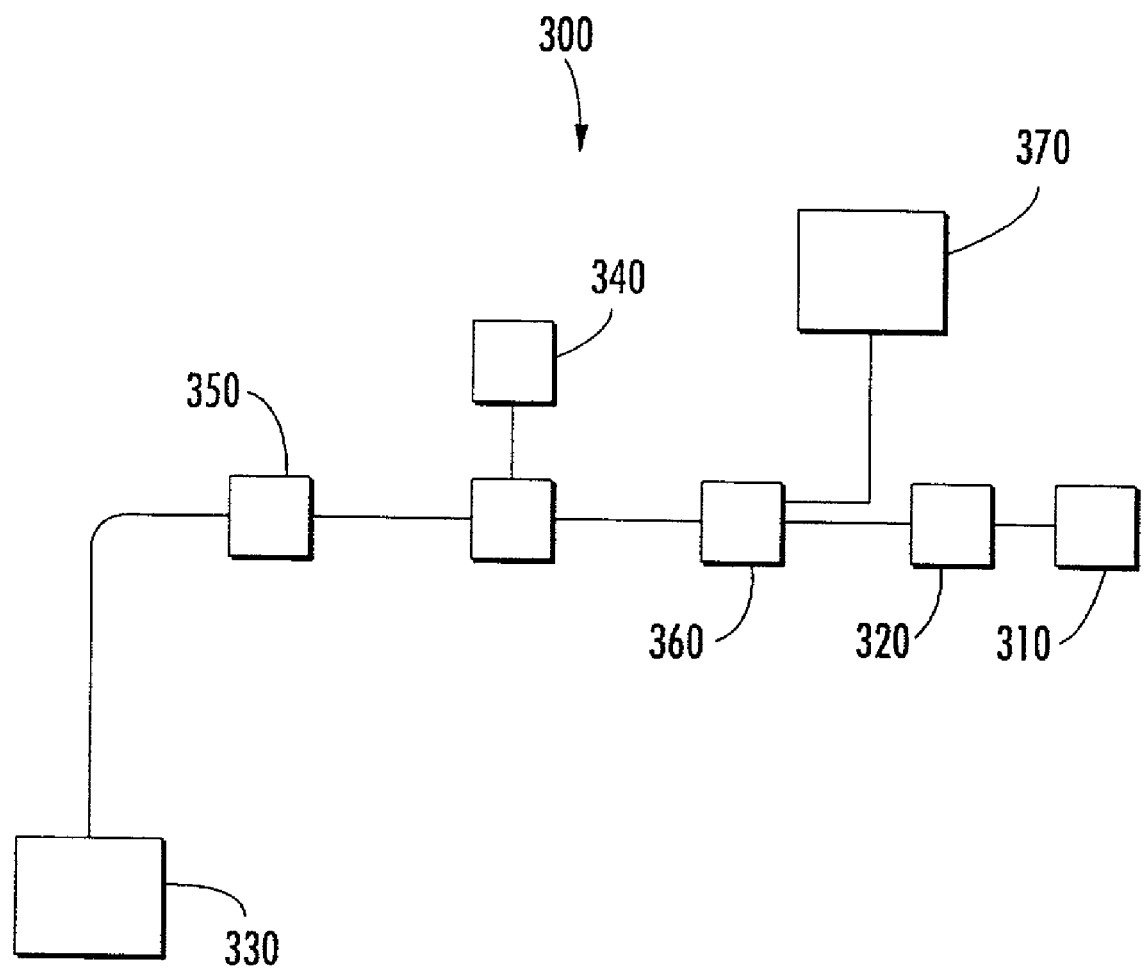
FIG. 2 is a schematic diagram of a batch apparatus for foaming a polymeric film according to embodiments of the present invention.

A batch system for foaming the polymeric film is illustrated at FIG. 2 as 300. It will be appreciated that variations of this embodiment may be introduced without departing from the scope of the claims. In a typical foaming operation, carbon dioxide is provided from source 310 and is transported via pump 320 to batch foaming cell 330. A pressure safety rupture disk 350 is provided prior to entry to cell 330 and may be used as deemed appropriate. The batch foaming cell 330 may be placed in an appropriate containing vessel (not shown) if desired such as, for example, an oven. The oven may be equipped with heaters, fans, and the like to facilitate with the batch processing. The selection of these components is known to one skilled in the art. During processing of the film, the pressure may be monitored via transducer system 340. Pressure may also be vented at 360 as required during operation. A control valve assembly 370 is in communication with the batch foaming cell 330 and allows for pressure to be vented from the batch foaming cell 330. The batch foaming cell 330 is preferably a view cell.

The polymeric film may be contained in the batch foaming cell through a number of various methods. One technique for holding the polymeric film is illustrated in FIGS. 3a and 3b by system 200. FIG. 3a is an exploded perspective view of the system 200 and FIG. 3b is a perspective view of the system 200. As depicted, polymeric film 210 is positioned between opposed plates 220 and 230. The opposed plates 220 and 230 are typically present in the form of steel brackets. Bolts 240 and 250 are perpendicular to the axis I coextensive with the length of the film 210 and plates 220 and 230. As depicted, the bolts 240 and 250 extend through the plates 220, 230 and film 210 and, when tightened, serve to clamp or "sandwich" the film 210 between the plates so as to minimize any available expansion volume (see e.g., FIG. 3b). The clamp is believed to serve to reduce instant diffusion of carbon dioxide from the polymer matrix of film 210 to the external environment. Also present in the plates 220 and 230 are cooling channels 260 and 270, respectively. Channels 260 and 270 are employed to pass a cooling fluid (e.g., liquid nitrogen) therethrough, which may allow for rapid or instant freezing of the outer later or "skin" of the polymer film 210. At this time, carbon dioxide is vented from the cell. Use of a cooling fluid is also believed to potentially help increase the melt strength of the polymer matrix near the skin and help retain carbon dioxide in the polymer film for a uniform growth of the microcells such that a uniform, closed-cell results. After cooling, the film may be removed from the cell according to known and accepted techniques.

The following examples are meant to illustrate the invention and are not intended to limit the scope of the invention as defined by the claims.

Example 1

PMMA Polymeric Film

Figure 4:
FIG. 4 is a photograph of a film foamed according to embodiments of the present invention.
Figure 6:
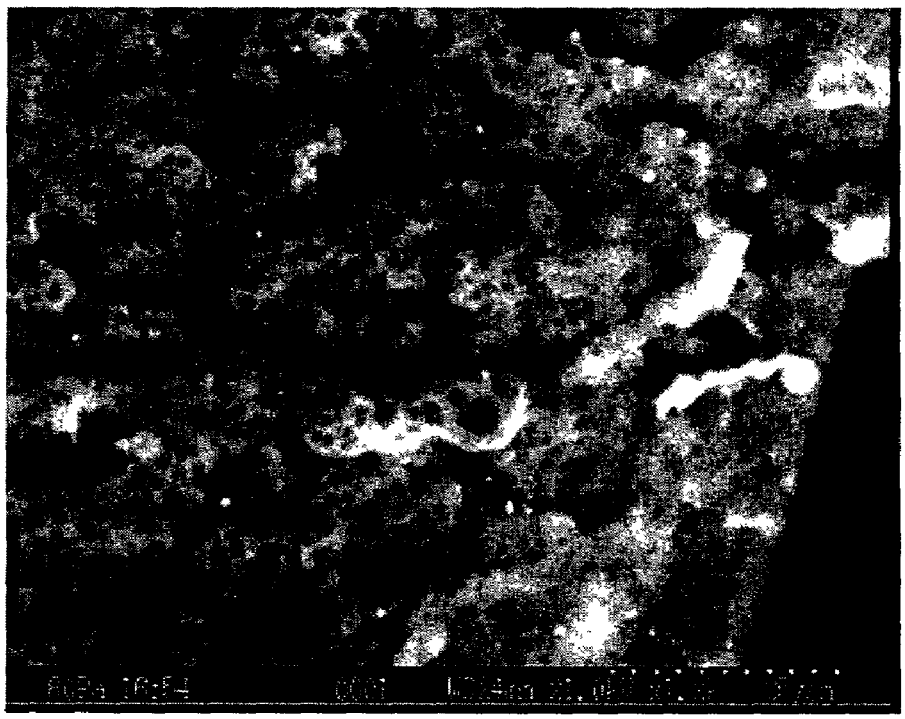
FIG. 6 is a photograph of a film foamed according to prior art techniques.
Figure 7:
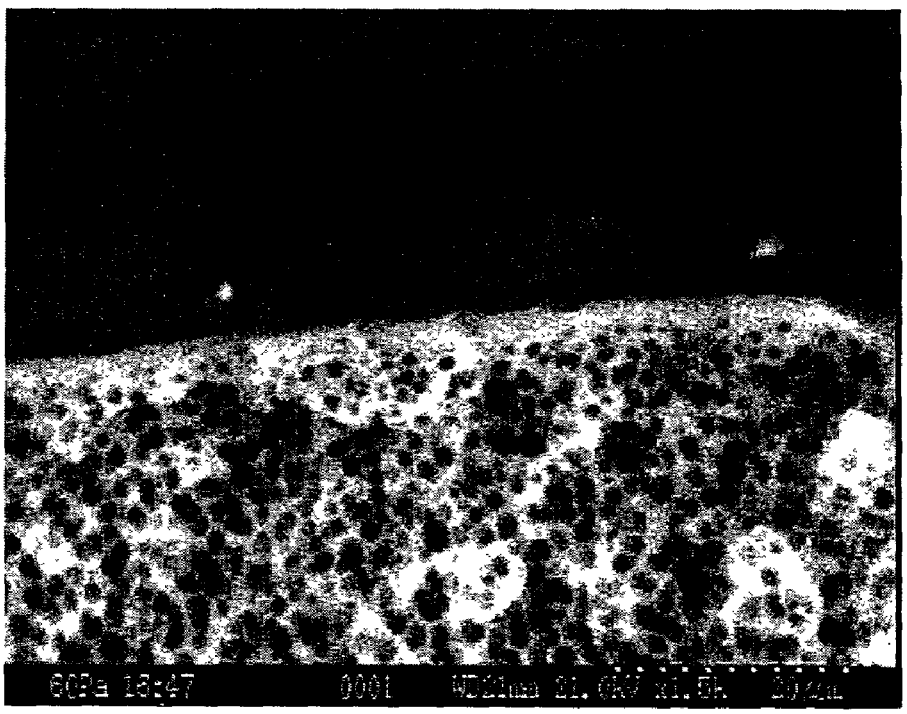
FIG. 7 is a photograph of a film foamed according to embodiments of the present invention.

Thin films of poly(methyl methacrylate) (PMMA) are solution cast from toluene (15 percent polymer) and prepared to a final thickness between about 50 and about 150 μm. An expansion and diffusion barrier "clamp", such as, for example, set forth in FIGS. 3a and 3b, is designed to sandwich the polymer film and minimize the available expansion volume. After sufficient exposure of the film to carbon dioxide at 4500 psi at 40° C., it is determined that in the presence of an expansion barrier, the cell size distribution is uniform with a mean cell size of about 2 μm and a skin of about 2 μm thick. A sharp transition of less than 0.5 μm is observed between the foamed core and the skin. FIG. 4 is a photograph illustrating the film foamed according to this example.

Example 2

Comparative Example

Figure 5:
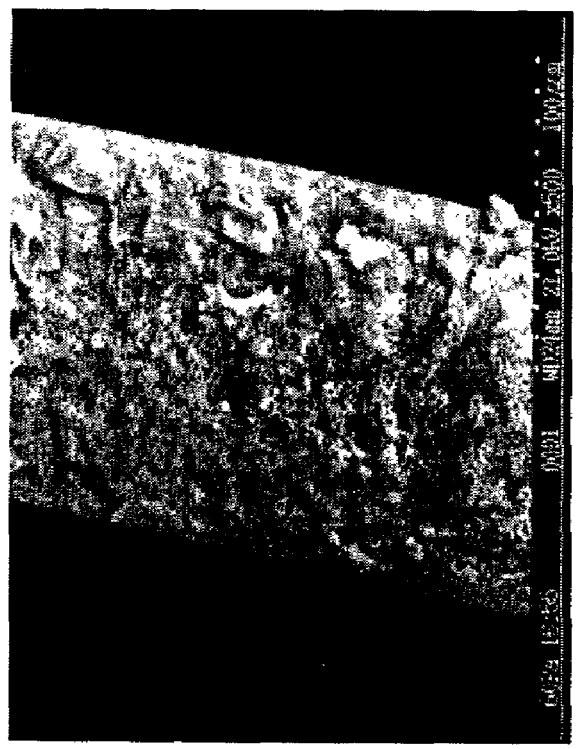
FIG. 5 is a photograph of a film foamed according to prior art techniques.

A thin polymeric film is foamed in carbon dioxide without being held in a clamp, in contrast to the film of Example 1. Processing conditions were similar to those of Example 1. The foamed film that is formed is less desirable in comparison to the film formed in Example 1. The resulting outer, unfoamed skin is about 25 μm thick and the transition region between the skin and inner core of the film contained a heterogeneous distribution of cell. FIG. 5 is a photograph illustrating the film foamed according to this example.

Example 3

Nanofoamed Thin Film

Figure 8:
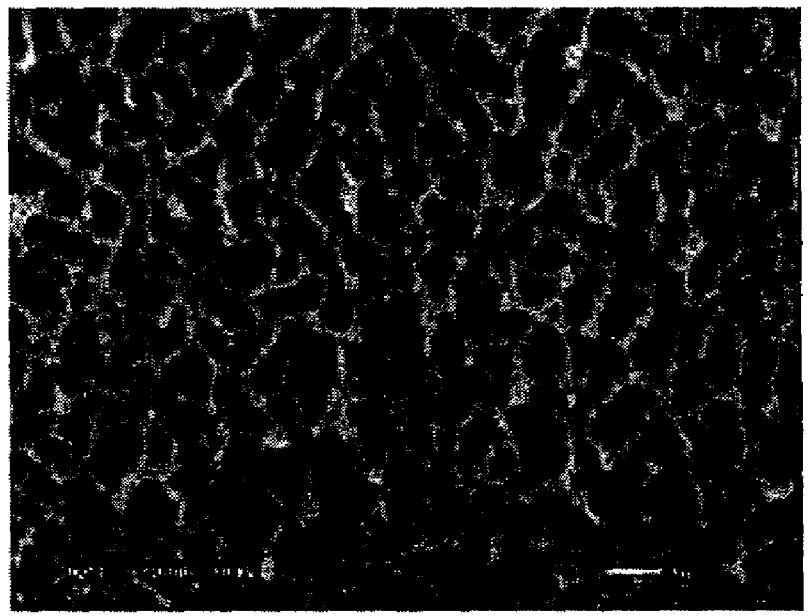
FIG. 8 is a photograph illustrating the morphology of a closed cell nanofoam utilizing fillers made according to embodiments of the present invention.
Figure 9:
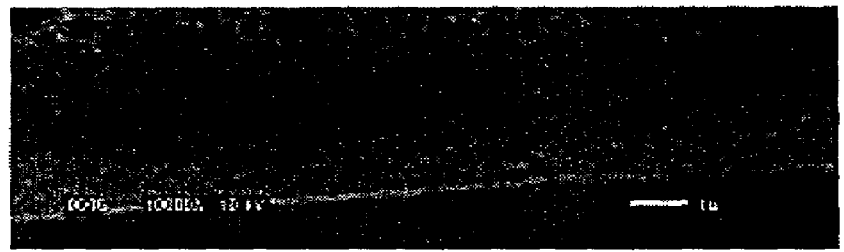
FIG. 9 is a photograph of a foamed skin layer of the nanofoam illustrated in FIG. 8.

Thin films of poly(methyl methacrylate) (PMMA) are spin coated on a silicon wafer from a toluene (3 percent polymer) solution to a final film thickness ranging from 1 to 10 microns. The experimental procedure similar to the one outlined in Example 1 is followed. Sufficient exposure of the film to carbon dioxide at 5000 psi at 35° C. followed by a rapid depressurization yields PMMA nanofoams with the cell diameters ranging from 100 nm upwards to 1000 nm. FIG. 8 is a photograph illustrating the closed cell nanofoam morphology. FIG. 9 shows the foamed skin layer of the same film. The skin is characterized by closed cells with cell diameters ranging from 100 nm to 500 nm and also has a minimal transition region.

Example 4

Thin Film Formation

A film is deposited on a substrate using a suitable technique. The film size ranges from 100 nm to 1 μm. The film on the substrate is then positioned between the substrate and the diffusion barrier. The system is then pressurized to 5000 psi at 45° C. and allowed to soak for an appropriate amount of time. The system is then rapidly depressurized so as to create a foam. The thin film is then separated from the substrate so as to intend to not disturb the microstructure of the sample. The film is then deposited on a TEM grid and images are collected.

Example 5

Foamed Material Utilizing Filler

Figure 10:
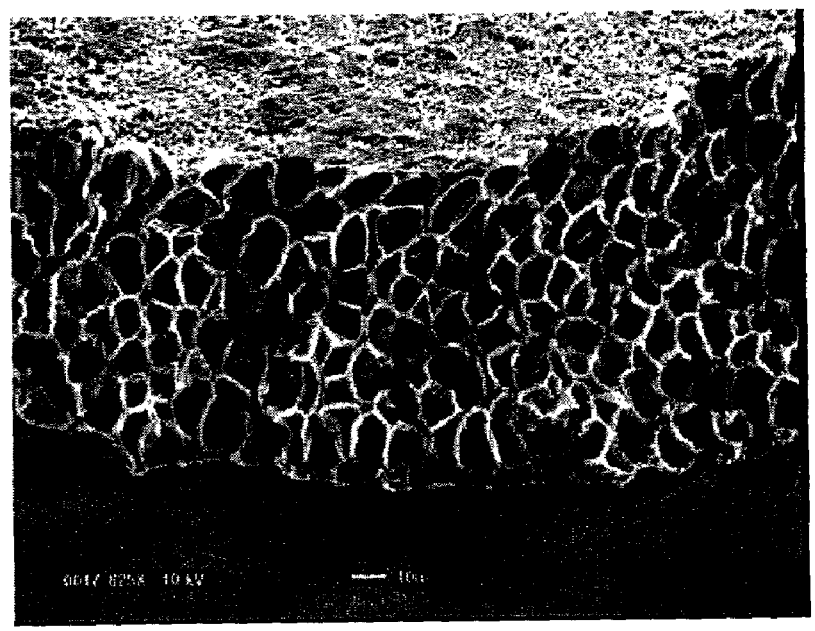
FIG. 10 is a photograph illustrating a pure (poly)methyl methacrylate foam made according to embodiments of the present invention.
Figure 11:
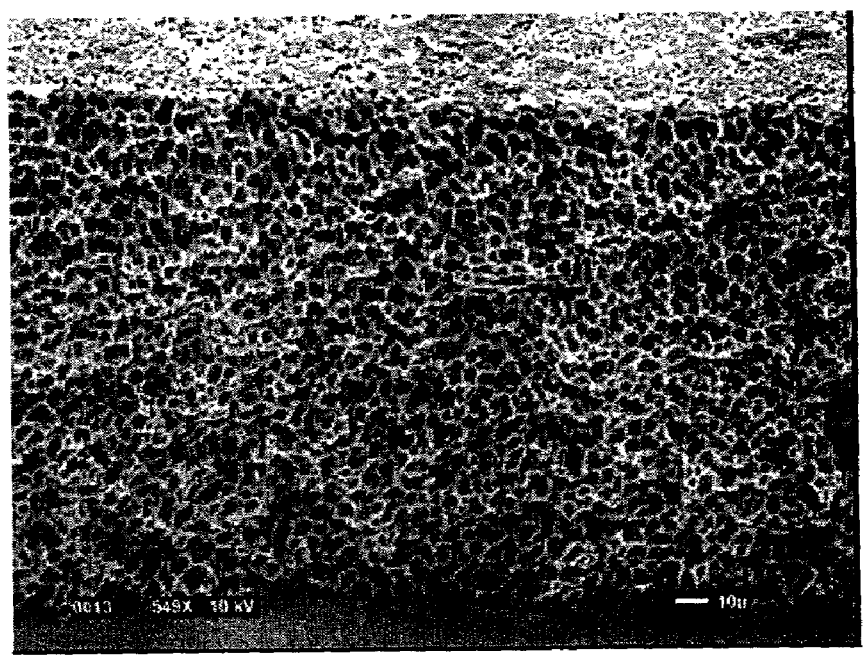
FIG. 11 is a photograph illustrating a foam similar to that made as illustrated in FIG. 10 but with the addition of 5 weight percent nanoglass beads.

Nanoglass beads (mean bead diameter approximately 30 nm) suspended in Methyl Ethyl Ketone (MEK) are blended with poly(methyl methacrylate) (PMMA) in a MEK solution. These beads have similar surface charges and so tend to repel each other and hence avoid agglomeration in solution. The polymer solution with the nanofiller is cast into thin films to a final thickness between about 50 and 100 μm, as in Example 1. FIG. 10 shows a pure PMMA foam generated using carbon dioxide at 5000 psi and 120° C. The foam sample is characterized by mean cell diameters in the order of 10 μm and cell density in the order of $10^9$ cells/cm$^3$ of the material. FIG. 11 shows the photograph of the same polymer film but with the addition of 5 weight percent nanoglass beads. The addition of the nanofiller results in a three-orders of magnitude increase in cell density ($10^{12}$ cells/cm$^3$) and smaller cell diameters of 1 to 2 μm.

The invention has been described in detail with respect to the preferred embodiments set forth herein. It should be appreciated that these embodiments are for the purposes of illustrating the invention and are not meant to limit the scope of the invention as defined by the claims.

What is claimed is:

1. A polymeric material that has a plurality of cells formed therein, said polymeric material comprising:
   a foamed layer comprising a plurality of uniform cells having an average diameter of 10 nm to 10 μm in a closed cell network, wherein said foamed layer is present in a volume ranging from about 80 to about 99 percent based on the volume of the polymeric material;
   a transition layer positioned adjacent said foamed layer, wherein said transition layer is present in a volume ranging from about 0 to about 10 percent based on the volume of the polymeric material; and
   at least one unfoamed outer layer positioned adjacent to said transition layer, wherein said outer layer is present in a volume ranging from about 0.01 to about 10 percent based on the volume of the polymeric material
   wherein the material has a thickness ranging from 0.1 μm to 200 μm.

2. The polymeric material according to claim 1, wherein said material is present in the form of a film.

3. The polymeric material according to claim 1, wherein said polymeric material comprises a thermoplastic polymer.

4. The polymeric material according to claim 3, wherein the thermoplastic polymer is selected from the group consisting of polyvinyl chloride, polyolefins, polyesters, nylons, fluoropolymers, polyurethane, polystyrene, polyimides, polyetherimides, polysulfones, polycarbonate, polycarprolactone, polyethylene terephthalate, polymethyl methacrylate, cellulosic resins, acrylic resins, blends thereof, and mixtures thereof.

5. The polymeric material according to claim 1, wherein said polymeric material comprises a thermoset polymer.

6. The polymeric material according to claim 1, wherein the thickness of said at least one outer layer ranges from about 0.001 μm to about 10 μm.

7. The polymeric material according to claim 1, wherein said material is formed from a composition comprising a polymer and a crosslinking agent, wherein the composition has reacted to form a network structure.

8. The polymeric material according to claim 1, further comprising a filler.

9. The polymeric material according to claim 8, wherein the filler is selected from the group consisting of colloidal silica, colloidal gold, carbon black, clay particles, and combinations thereof.

10. The polymeric material according to claim 8, wherein the filler is a nanofiller.

11. An article of manufacture comprising the polymeric material according to claim 1.

12. The article of manufacture according to claim 11, wherein said article of manufacture is an electronic device.

13. The article of manufacture according to claim 11, wherein said article of manufacture is a microelectronic device.

14. The article of manufacture according to claim 11, wherein said article of manufacture is an interlayer insulating material in a microelectronic device.

15. The article of manufacture according to claim 11, wherein said article of manufacture is selected from the group consisting of food packaging, an insulation support, and a structural support.

16. The polymeric material of claim 1, wherein said at least one unfoamed outer layer is present in a volume ratio of from about 0.1 to 10 percent based on the volume of the polymeric material.

17. The polymeric material of claim 16, wherein said at least one unfoamed outer layer has a thickness of about 0.5 µm to about 10 µm.

18. The polymeric material of claim 11, wherein said at least one unfoamed outer layer is present in a volume ratio of from about 0.1 to 10%.

19. The polymeric material of claim 18, wherein said at least one unfoamed outer layer has a thickness of about 0.5 µm to about 10 µm.

20. The polymeric material of claim 1, wherein the material has a thickness ranging from 0.1 µm to 100 µm.

21. The polymeric material of claim 1, wherein the material has a thickness ranging from 0.1 µm to 50 µm.

22. The polymeric material of claim 1, wherein said foamed layer is present in a volume ranging from about 90 to about 99 percent based on the volume of the polymeric material.

23. The polymeric material of claim 1, wherein said foamed layer is present in a volume ranging from about 95 to about 99 percent based on the volume of the polymeric material.

* * * * *